United States Patent
Hao et al.

(10) Patent No.: US 11,476,454 B2
(45) Date of Patent: Oct. 18, 2022

(54) METHOD FOR PREPARING NEGATIVE ELECTRODE MATERIAL FOR BATTERY, LITHIUM ION BATTERY AND SOLID-STATE BATTERY

(71) Applicant: Robert Bosch GmbH, Stuttgart (DE)

(72) Inventors: Xiaogang Hao, Shanghai (CN); Rongrong Jiang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 16/306,601

(22) PCT Filed: Jun. 3, 2016

(86) PCT No.: PCT/CN2016/084786
§ 371 (c)(1),
(2) Date: Dec. 3, 2018

(87) PCT Pub. No.: WO2017/206181
PCT Pub. Date: Dec. 7, 2017

(65) Prior Publication Data
US 2019/0190011 A1    Jun. 20, 2019

(51) Int. Cl.
*H01M 4/1395* (2010.01)
*H01M 4/134* (2010.01)
(Continued)

(52) U.S. Cl.
CPC ......... *H01M 4/1395* (2013.01); *H01M 4/134* (2013.01); *H01M 4/386* (2013.01);
(Continued)

(58) Field of Classification Search
CPC .... H01M 4/1395; H01M 4/134; H01M 4/386; H01M 4/661; H01M 10/058; H01M 10/0525; H01M 2004/027
See application file for complete search history.

(56) References Cited

U.S. PATENT DOCUMENTS

| | | | |
|---|---|---|---|
| 2006/0139846 A1* | 6/2006 | Mori | H01G 9/155 361/272 |
| 2006/0146475 A1* | 7/2006 | Zhong | H01G 9/155 361/301.1 |

(Continued)

FOREIGN PATENT DOCUMENTS

| | | |
|---|---|---|
| CN | 101304085 A | 11/2008 |
| CN | 101369652 A | 2/2009 |

(Continued)

OTHER PUBLICATIONS

International Search Report for Application No. PCT/CN2016/084786 dated Mar. 14, 2017 (English Translation, 2 pages).

*Primary Examiner* — Eric R Smith
(74) *Attorney, Agent, or Firm* — Michael Best & Friedrich LLP

(57) ABSTRACT

The present invention provides a method for preparing a negative electrode material for a battery, the method comprising the following steps: a) dry-mixing the following components, without adding any solvent, to obtain a dry mixture: polyacrylic acid, a silicon-based material, and an alkali metal hydroxide and/or an alkaline earth metal hydroxide, and an optionally present carbon material; and b) mixing the dry mixture obtained in step a) with an aqueous solvent, to obtain the negative electrode material. The present invention also provides a lithium ion battery and a solid-state battery, wherein a negative electrode of the lithium ion battery and the solid-state battery is prepared from the negative electrode material obtained by the method.

27 Claims, 6 Drawing Sheets

(51) Int. Cl.
    *H01M 4/38*      (2006.01)
    *H01M 4/66*      (2006.01)
    *H01M 10/0525*   (2010.01)
    *H01M 10/058*    (2010.01)
    *H01M 4/02*      (2006.01)

(52) U.S. Cl.
    CPC ......... *H01M 4/661* (2013.01); *H01M 10/058* (2013.01); *H01M 10/0525* (2013.01); *H01M 2004/027* (2013.01)

(56)                References Cited

U.S. PATENT DOCUMENTS

| | | | |
|---|---|---|---|
| 2012/0094178 A1* | 4/2012 | Loveridge | H01M 4/134 429/217 |
| 2016/0049660 A1* | 2/2016 | Hwang | H01M 4/622 429/217 |
| 2016/0099463 A1* | 4/2016 | Lee | H01M 4/463 252/62.9 PZ |
| 2016/0315310 A1* | 10/2016 | Kamo | H01M 4/364 |
| 2021/0193990 A1* | 6/2021 | Awano | H01M 4/48 |

FOREIGN PATENT DOCUMENTS

| | | |
|---|---|---|
| CN | 103855382 A | 6/2014 |
| CN | 104813525   | 7/2015 |
| CN | 105633411   | 6/2016 |
| JP | 2015156328 A | 8/2015 |

* cited by examiner step a): dry mixing step b): prepare NaOH aqueous solution in advance step c): slurry preparation

METHOD FOR PREPARING NEGATIVE ELECTRODE MATERIAL FOR BATTERY, LITHIUM ION BATTERY AND SOLID-STATE BATTERY

BACKGROUND OF THE INVENTION

The present invention relates to a method for preparing a negative electrode material for a battery. The present invention also relates to a lithium ion battery and a solid-state battery, wherein a negative electrode of the lithium ion battery and the solid-state battery is prepared from the negative electrode material obtained by the method.

The emergence of lithium ion batteries can be traced to the late 1980s. After this time, and especially after 1990, research into lithium ion batteries developed rapidly.

A lithium ion battery generally comprises: a positive electrode (i.e. cathode) containing lithium, a negative electrode (i.e. anode), a separator and an electrolyte.

Negative electrode active materials commonly used in lithium ion batteries include graphite and silicon. Since silicon has a large theoretical capacity ($Li_{4.4}Si$, 4200 mAh $g^{-1}$), silicon is considered to be a very promising negative electrode active material for lithium ion batteries.

As shown in FIG. 3, it has been proposed that a negative electrode material containing graphite be prepared by the following method: first of all, a binder is mixed with a solvent, to prepare a binder solution; graphite and an additive are then added sequentially to the binder solution, to obtain a negative electrode material slurry.

However, when a negative electrode material containing small particles of an active material (e.g. a nanometre-scale or micron-scale silicon-based material) is prepared by the above method, there are many problems, e.g. much time is taken up, and the slurry obtained is not uniform.

Hence, there is a need to develop a method for preparing a battery negative electrode material, by which method the above drawbacks can be overcome.

SUMMARY OF THE INVENTION

Through in-depth research, the inventors of the present invention have already developed a novel method for preparing a negative electrode material for a battery, and a novel lithium ion battery and solid-state battery.

In one aspect, the present invention provides a method for preparing a negative electrode material for a battery, the method comprising the following steps:
 a) dry-mixing the following components, without adding any solvent, to obtain a dry mixture:
  polyacrylic acid,
  a silicon-based material, and
  an alkali metal hydroxide and/or an alkaline earth metal hydroxide, and
  an optionally present carbon material; and
 b) mixing the dry mixture obtained in step a) with an aqueous solvent, to obtain the negative electrode material.

In some practical examples, the alkali metal hydroxide and/or the alkaline earth metal hydroxide is selected from lithium hydroxide, sodium hydroxide, potassium hydroxide, calcium hydroxide and combinations thereof, and is preferably lithium hydroxide.

In some practical examples, the molar ratio of carboxyl groups in the polyacrylic acid to the total amount of hydroxide ions in the alkali metal hydroxide and/or alkaline earth metal hydroxide is 0.2:1 to 1.5:1, preferably 0.8:1 to 1.2:1.

In some practical examples, the alkali metal hydroxide and/or the alkaline earth metal hydroxide contains lithium hydroxide or is lithium hydroxide; and in step a), the materials which are dry-mixed also contain lithium carbonate; preferably, the molar ratio of lithium ions in the lithium carbonate to carboxyl groups in the polyacrylic acid is 0.0001:1 to 0.2:1.

In some practical examples, the dry-mixing time in step a) may be 30 seconds to 30 minutes, preferably 2-10 minutes, more preferably 2-5 minutes.

In another aspect, the present invention also provides another method for preparing a negative electrode material for a battery, the method comprising the following steps:
 a) dry-mixing the following components, without adding any solvent, to obtain a dry mixture:
  polyacrylic acid,
  a silicon-based material, and
  an optionally present carbon material;
 b) mixing an alkali metal hydroxide with water, to obtain an aqueous solution of the alkali metal hydroxide; and
 c) mixing the dry mixture obtained in step a), the aqueous solution of the alkali metal hydroxide obtained in step b) and an optionally present aqueous solvent, to obtain the negative electrode material.

In some practical examples, the alkali metal hydroxide may be selected from lithium hydroxide, sodium hydroxide, potassium hydroxide and combinations thereof, and is preferably sodium hydroxide.

In some practical examples, the molar ratio of carboxyl groups in the polyacrylic acid to hydroxide ions in the alkali metal hydroxide is 0.2:1 to 1.5:1, preferably 0.8:1 to 1.2:1.

In some practical examples, the dry-mixing time in step a) may be 30 seconds to 30 minutes, preferably 2-10 minutes, more preferably 2-5 minutes.

In another aspect, the present invention also provides a lithium ion battery, containing a negative electrode prepared from a negative electrode material obtained by the above-mentioned method according to the present invention.

In one aspect, the present invention also provides a solid-state battery, containing a negative electrode prepared from a negative electrode material obtained by the above-mentioned method according to the present invention.

In some practical examples, the negative electrode of the lithium ion battery or the solid-state battery also contains a negative electrode current collector, which may be a nickel foil or a nickel-coated copper foil.

The inventors of the present invention have unexpectedly discovered that the method of the present invention for preparing a negative electrode material has simple operations and takes a short time, and does not have exacting requirements for the mixing equipment; an ordinary mechanical stirring apparatus may be used to carry out the preparation method of the present invention. This represents a significant cost saving for industrial production.

Moreover, the negative electrode material obtained by the method of the present invention has excellent properties, manifested as uniform mixing of the negative electrode material slurry, a long storage time, and good storage stability.

In addition, the negative electrode material obtained by the method of the present invention has strong adhesion, and can withstand changes in volume of the negative electrode active material (in particular a silicon-based material) in the course of repeated charging/discharging cycles, so that a negative electrode and battery having excellent electrochemical properties (e.g. cycle properties and rate properties) is provided.

Various other features, aspects and advantages of the present invention will become more obvious if the accompanying drawings below are referred to.

DETAILED DESCRIPTION

Unless otherwise defined, all technical and scientific terms used herein have the meanings generally understood by those skilled in the art. If any inconsistencies are present, the definitions provided in the present application shall be taken to be the standard.

Unless otherwise indicated, the ranges of values set out herein are intended to include the end points of the ranges, as well as all values and all sub-ranges within the range in question.

All materials, contents, methods, devices and practical examples herein and all the accompanying drawings are demonstrative, and unless otherwise stated, should not be understood to be limiting.

The terms "cell" and "battery" used herein are interchangeable.

The term "contains" or "comprises" used herein means that another component or another step which does not affect the final result may also be contained or included. The term "contains" or "comprises" covers the cases of "consists of . . . " and "consists mainly of . . . ". The method and products of the present invention may contain or comprise necessary technical features and/or defining features described herein, as well as any other and/or optionally present constituent, component, step or defining feature described herein. The method and products of the present invention may also consist of necessary technical features and/or defining features described herein, or consist mainly of necessary technical features and/or defining features described herein.

Unless otherwise indicated, when "a", "the" or a similar term is used herein, in particular in the claims, the term defined after it should be understood as being able to be singular and plural.

The term "optionally present" or "optional" indicates two alternative solutions, i.e. in the method and products herein, the subject matter defined by the term "optionally present" or "optional" may or may not be present.

Unless otherwise indicated, all materials and reagents used herein are commercially available.

Unless otherwise indicated or unless there is an obvious contradiction, all operations carried out herein may be carried out at room temperature and atmospheric pressure.

Practical examples of the present invention are described in detail below.

[Method for Preparing Negative Electrode Material]

[Method 1]

Figure 1:
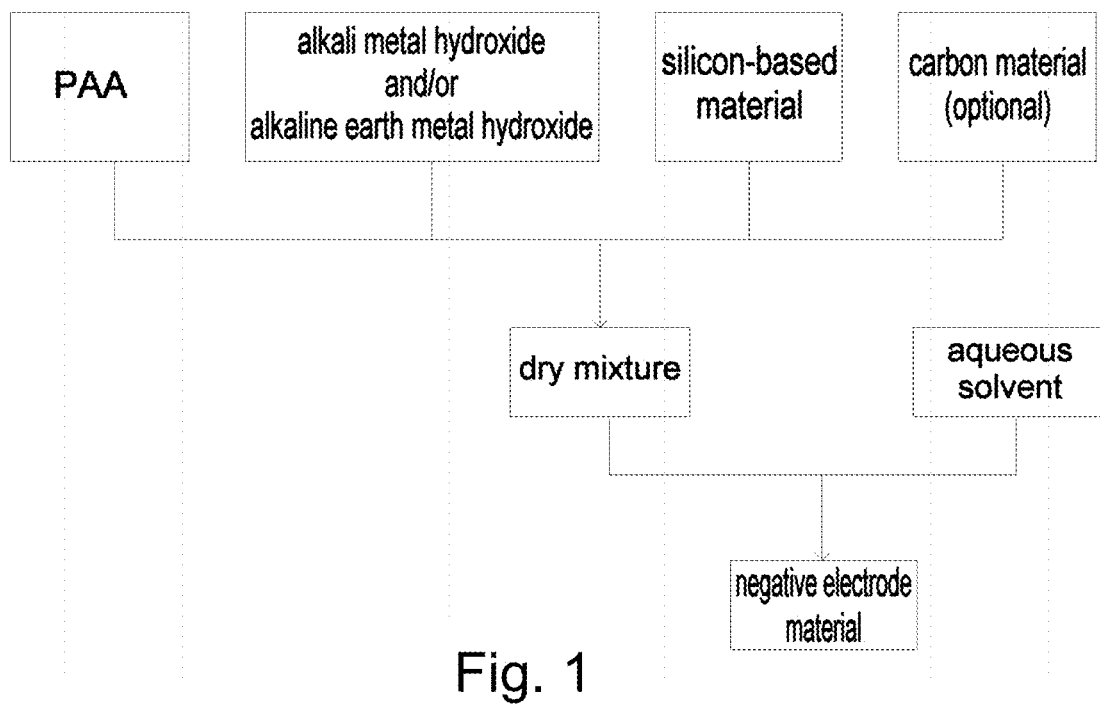
FIG. 1 schematically shows a flow chart of a method for preparing a negative electrode material according to some embodiments of the present invention.

In one aspect, as shown in FIG. 1, the present invention provides a method for preparing a negative electrode material for a battery, the method comprising the following steps:

a) dry mixing the following components are dry-mixed, without adding any solvent, to obtain a dry mixture:

polyacrylic acid, a silicon-based material, and an alkali metal hydroxide and/or an alkaline earth metal hydroxide, and an optionally present carbon material; and b) slurry preparation the dry mixture obtained in step a) is mixed with an aqueous solvent, to obtain a negative electrode material.

There are no special requirements for the alkali metal hydroxide and alkaline earth metal hydroxide; commonly used alkali metal hydroxides and/or alkaline earth metal hydroxides may all be used in the present invention. In some practical examples, the alkali metal hydroxide and/or alkaline earth metal hydroxide may be selected from lithium hydroxide, sodium hydroxide, potassium hydroxide, calcium hydroxide and combinations thereof. Preferably, the alkali metal hydroxide and/or alkaline earth metal hydroxide is an alkali metal hydroxide, more preferably lithium hydroxide.

According to method 1 of the present invention, the polyacrylic acid and the alkali metal hydroxide and/or alkaline earth metal hydroxide may undergo a chemical reaction in the presence of the aqueous solvent, to produce an alkali metal salt and/or an alkaline earth metal salt of polyacrylic acid. The alkali metal salt and/or alkaline earth metal salt of polyacrylic acid so obtained may be used as a binder of the negative electrode material. In some practical examples, the molar ratio of carboxyl groups in the polyacrylic acid to the total amount of hydroxide ions in the alkali metal hydroxide and/or alkaline earth metal hydroxide is 0.2:1 to 1.5:1, preferably 0.8:1 to 1.2:1.

In particular, if the rate of dissolution of the alkali metal hydroxide and/or alkaline earth metal hydroxide (e.g. lithium hydroxide) in water is close to the rate of dissolution of the polyacrylic acid in water, then when the dry mixture containing the polyacrylic acid and the alkali metal hydroxide and/or alkaline earth metal hydroxide is brought into contact with water, the dissolved alkali metal hydroxide and/or alkaline earth metal hydroxide can very advantageously undergo a chemical reaction with the dissolved polyacrylic acid, to produce the alkali metal salt and/or alkaline earth metal salt of polyacrylic acid; this is favourable for obtaining a uniformly mixed and fully reacted negative electrode material.

In step a) of method 1 of the present invention, no inorganic solvent (including water) or organic solvent is added. Water of crystallization carried in the materials themselves is not classed as added water. Dry mixing may be carried out by any suitable method, in any suitable sequence. In some practical examples, all of the materials to be dry-mixed may be added at the same time. In some practical examples, various materials to be dry-mixed may also be added sequentially as required. In some practical examples, two or more of the materials to be dry-mixed may also be mixed in advance, then a mixture so obtained is mixed with the remaining one or more materials.

Similarly, in step b) of method 1 of the present invention, the materials may be mixed by any suitable method, in any suitable sequence, to prepare the negative electrode material slurry. In some practical examples, the dry mixture may be added to the aqueous solvent. In some practical examples, the aqueous solvent may also be added to the dry mixture.

In step a) and step b) of method 1 of the present invention, mixing may be carried out continuously or intermittently. Stirring may be carried out throughout method 1 as required. Stirring may also be carried out during part of method 1, e.g. throughout step a) or during part of step a), and/or throughout step b) or during part of step b). Stirring speeds may be set to be the same or different in different stages of mixing. A suitable mixing time may be set arbitrarily as required. For example, the mixing time may be set according to factors such as stirring apparatus, stirring speed and mass of stirred materials. In some practical examples, if the stirring speed is faster, the mixing time can be shorter. In some practical examples, if the stirring speed is slower, the mixing time can be longer.

[Method 2]

Figure 2:
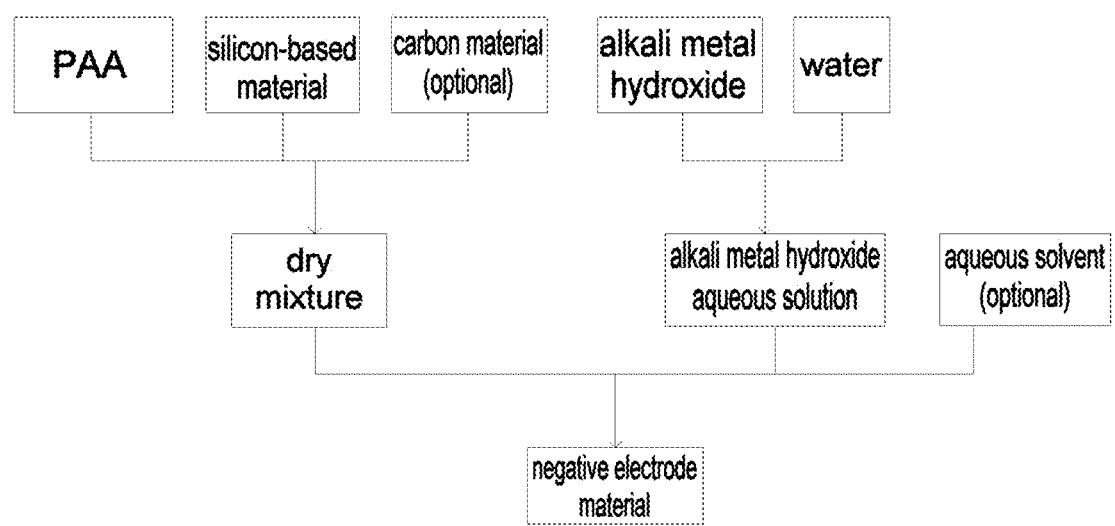
FIG. 2 schematically shows a flow chart of a method for preparing a negative electrode material according to some embodiments of the present invention.
Figure 3:
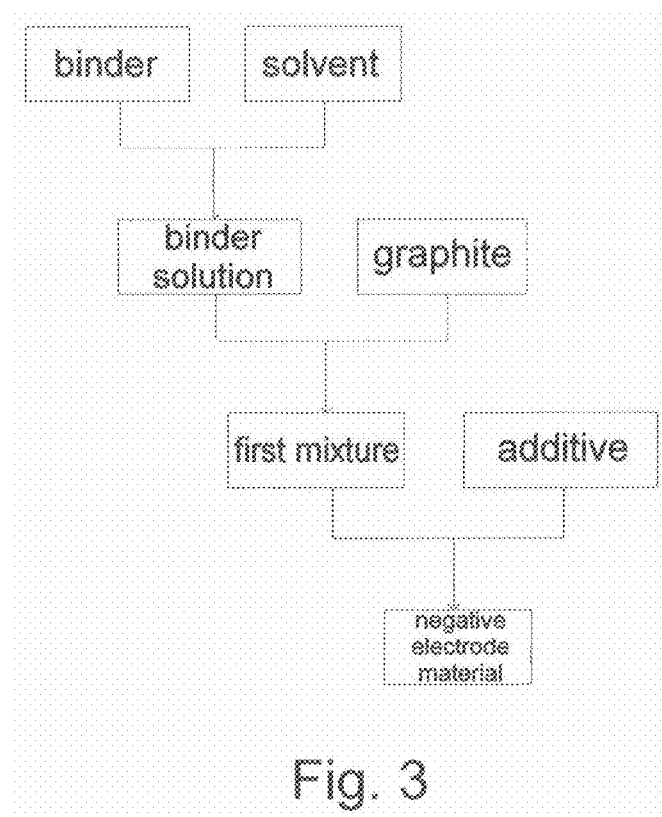
FIG. 3 schematically shows a flow chart of a method for preparing a negative electrode material according to the prior art.

In another aspect, as shown in FIG. 2, the present invention also provides a method for preparing a negative electrode material for a lithium ion battery, the method comprising the following steps:

a) dry mixing the following components are dry-mixed, without adding any solvent, to obtain a dry mixture:

polyacrylic acid, a silicon-based material, and an optionally present carbon material;

b) preparation of aqueous solution alkali metal hydroxide an alkali metal hydroxide is mixed with water, to obtain an aqueous solution of the alkali metal hydroxide; and c) slurry preparation the dry mixture obtained in step a), the aqueous solution of the alkali metal hydroxide obtained in step b) and an optionally present aqueous solvent are mixed, to obtain a negative electrode material.

There are no special requirements for the alkali metal hydroxide; commonly used alkali metal hydroxides may all be used in the present invention. In some practical examples, the alkali metal hydroxide may be selected from lithium hydroxide, sodium hydroxide, potassium hydroxide and combinations thereof, and is preferably sodium hydroxide.

According to method 2 of the present invention, the polyacrylic acid and the alkali metal hydroxide may undergo a chemical reaction in the presence of the aqueous solvent, to produce an alkali metal salt of polyacrylic acid. The alkali metal salt of polyacrylic acid so obtained may be used as a binder of the negative electrode material. In some practical examples, the molar ratio of carboxyl groups in the polyacrylic acid to hydroxide ions in the alkali metal hydroxide is 0.2:1 to 1.5:1, preferably 0.8:1 to 1.2:1.

In particular, if the rate of dissolution of the alkali metal hydroxide (e.g. sodium hydroxide) in water is much faster than the rate of dissolution of the polyacrylic acid in water, then when the dry mixture containing the polyacrylic acid is brought into contact with the aqueous solution of the alkali metal hydroxide, the pre-dissolved alkali metal hydroxide can very advantageously undergo a chemical reaction with the newly dissolved polyacrylic acid, to produce the alkali metal salt of polyacrylic acid. Moreover, aggregation of material will not be caused by rapid deliquescence of the alkali metal hydroxide; this is favourable for obtaining a uniformly mixed and fully reacted negative electrode material slurry.

In method 2 of the present invention, steps a) and b) may be carried out separately at the same time, or a) and then b) may be carried out, or b) and then a) may be carried out.

In step a) of method 2 of the present invention, no inorganic solvent (including water) or organic solvent is added. Water of crystallization carried in the materials themselves is not classed as added water. Dry mixing may be carried out by any suitable method, in any suitable sequence. In some practical examples, all of the materials to be dry-mixed may be added at the same time. In some practical examples, various materials to be dry-mixed may also be added sequentially as required. In some practical examples, two of the materials to be dry-mixed may also be mixed in advance, then a mixture so obtained is mixed with the remaining material.

Similarly, in step b) of method 2 of the present invention, the materials may be mixed by any suitable method, in any suitable sequence, to prepare the aqueous solution of the alkali metal hydroxide. In some practical examples, the alkali metal hydroxide may be added to water as required. In some practical examples, water may also be added to the alkali metal hydroxide.

Similarly, in step c) of method 2 of the present invention, the dry mixture, the aqueous solution of the alkali metal hydroxide and the optionally present aqueous solvent may be mixed by any suitable method, in any suitable sequence, to prepare the negative electrode material slurry. In some practical examples, the dry mixture, the aqueous solution of the alkali metal hydroxide and the optionally present aqueous solvent may be added at the same time. In some practical examples, various materials to be mixed may also be added sequentially as required. In some practical examples, two of these materials may also be mixed in advance, then a mixture so obtained is mixed with the remaining material.

In step a), step b) and step c) of method 2 of the present invention, the mixing may be carried out continuously or intermittently. Stirring may be carried out throughout method 2 as required. Stirring may also be carried out during part of method 2, e.g. throughout step a) or during part of step a), and/or throughout step b) or during part of step b), and/or throughout step c) or during part of step c). Stirring speeds may be set to be the same or different in different stages of mixing. A suitable mixing time may be set arbitrarily as required. For example, the mixing time may be set according to factors such as stirring apparatus, stirring speed and mass of stirred materials. In some practical examples, if the stirring speed is faster, the mixing time can be shorter. In some practical examples, if the stirring speed is slower, the mixing time can be longer.

The prior art mentioned in the background art section comprises the following two steps: preparation of a binder solution, i.e. first of all a binder (e.g. PAA) is mixed with a solvent, to prepare a binder solution; then slurry preparation is carried out, i.e. other materials for a negative electrode are added to the binder solution, to obtain a negative electrode material slurry. Since a solvent has already been used in the first step in the prior art, the method in the prior art is referred to as "wet" mixing hereinbelow. Wet mixing has many problems, e.g. the viscosity of the binder solution is high, so it is difficult for the binder solution to be mixed uniformly with other materials. The mixing time is long; the entire preparation process takes 5-20 hours.

Unless otherwise stated or unless there is a contradiction, when the method of the present invention is mentioned hereinbelow, this shall be applicable to the abovementioned two methods of the present invention, i.e. method 1 and method 2.

In step a) of the method of the present invention, in each case, the dry materials are mixed without adding any solvent (including water); hence, step a) is in each case referred to as "dry" mixing hereinbelow. Dry mixing can uniformly mix materials within a short time (e.g. 30 seconds to 30 minutes), and shorten the total time of the entire preparation process to e.g. not more than 2 hours, or even not more than 1.5 hour or not more than 1 hour. In addition, dry mixing does not place exacting requirements on mixing equipment; an ordinary mechanical stirring apparatus can meet the requirements, hence the equipment costs and energy consumption costs of industrial production can be greatly reduced.

Moreover, the negative electrode material slurry obtained by the method of the present invention has excellent properties, e.g. manifested as slurry uniformity, a long storage time, and good storage stability. After a long period of storage, the viscosity of the slurry remains unchanged, and settling of solid components is not significant.

In addition, the negative electrode material slurry obtained by the method of the present invention has strong adhesion, and can withstand changes in volume of the negative electrode active material (in particular a silicon-based material) in the course of repeated charging/discharging cycles, so that a negative electrode and battery having excellent electrochemical properties (e.g. cycle properties and rate properties) can be provided.

In some practical examples of the method of the present invention, the dry-mixing time in step a) may be 30 seconds to 30 minutes, preferably 2-10 minutes, more preferably 2-5 minutes.

In some practical examples of method 2 of the present invention, the preparation time of the aqueous solution of the alkali metal hydroxide (step b) of method 2) may be 1-30 minutes.

In some practical examples of the method of the present invention, the slurry preparation time (step b) of method 1 or step c) of method 2) may be not more than 2 hours, preferably not more than 1.5 hour, more preferably not more than 1 hour.

There are no special requirements for the type, form, particle size and content of the polyacrylic acid (PAA), alkali metal hydroxide, alkaline earth metal hydroxide, silicon-based material and carbon material used in the present invention.

The sum of dry weights of all materials in the negative electrode material herein is 100 wt %.

In some practical examples of the method of the present invention, one or more, preferably all, of the polyacrylic acid (PAA), alkali metal hydroxide, alkaline earth metal hydroxide, silicon-based material and carbon material are in the form of particles and/or powder, or are ground into the form of particles and/or powder.

"Silicon-based material" means a material which contains silicon. Known silicon-based materials or silicon-containing materials used in lithium ion batteries or solid-state batteries may all be used in the present invention. The silicon-based material is mainly used as an active material of the battery negative electrode. The term "active material" used herein means a material capable of causing the intercalation/deintercalation of lithium in the course of repeated charging/discharging cycles.

In some practical examples, the silicon-based material may be selected from silicon, silicon alloys, silicon oxides, silicon/carbon composites and combinations thereof. In some practical examples, the silicon alloy may contain silicon and one or more metals selected from titanium, tin, aluminium, antimony, bismuth, arsenic, germanium and lead. In some practical examples, the silicon oxide may be a mixture of multiple oxides of silicon, e.g. the silicon oxide may be represented by $SiO_x$, where the average value of x is about 0.5 to about 2.

There are no special requirements for the particle size of the silicon-based material; common silicon-based material particle sizes are all suitable for the present invention. In some practical examples, the particle size of the silicon-based material may be nanometre-scale (i.e. from greater than or equal to 1 nanometre to less than 1 micron) or micron-scale (i.e. from greater than or equal to 1 micron to less than 1 mm). In some practical examples, the particle size of the silicon-based material may be 30 nm to 15 μm, e.g. 100 nm to 3 μm.

In some practical examples, based on the total dry weight of the negative electrode material, the content of the silicon-based material may be 5-88 wt %, preferably 10-50 wt %. A content of silicon-based material greater than or equal to 5 wt % can improve the capacity of the battery; a content of silicon-based material less than or equal to 88 wt % can improve the cycle performance of the battery.

"Carbon material" means a material containing carbon element. In this text, the carbon material is mainly used to improve the conductivity and dispersiveness of the battery negative electrode, and/or used as a filler. In some practical examples, the carbon material may be selected from carbon black, graphite, graphene, acetylene black, ketjenblack, carbon nanotubes, carbon nanofibres and combinations thereof. The carbon black is preferably superconducting carbon black (e.g. Super P purchased from the company Timcal, with particle size e.g. 20 nm). The graphite is preferably graphite powder (e.g. with a particle size of about 1-30 μm) and/or flake graphite (e.g. KS6L purchased from the company Timcal, with particle size e.g. about 6 μm). These carbon materials may be used alone or in any combination. In some practical examples, two or three of superconducting carbon black, graphite powder and flake graphite (e.g. KS6L) may be used at the same time. Superconducting carbon black has a small particle size and good conduction properties, helping to improve the one-dimensional conductivity and one-dimensional dispersiveness of the negative electrode material. Graphite powder and flake graphite have a large particle size and good conduction properties, helping to improve the two-dimensional conductivity, two-dimensional dispersiveness and cycle performance of the negative electrode material, and at the same time may also be used as a filler.

In some practical examples, based on the total dry weight of the negative electrode material, the total content of the carbon material may be 0-80 wt %, preferably 10-80 wt %, more preferably 10-70 wt %. When the total content of the carbon material lies in these ranges, the conductivity, dispersiveness and cycle performance of the negative electrode material can be advantageously improved.

The aqueous solvent may be water, or a mixture of water and a solvent miscible with water. In some practical examples, the aqueous solvent is water. In some practical examples, the aqueous solvent is a mixture of water and a solvent miscible with water. The solvent miscible with water may be an alcohol, e.g. a $C_1$-$C_6$ linear alcohol, preferably ethanol, n-propanol, isopropanol or a combination thereof.

In some practical examples, the ratio of the weight of the aqueous solvent to the total dry weight of the negative electrode material is 0.6:1 to 2:1. Such a ratio assists the uniform mixing of particulate materials or dry powder materials, so as to form a stable slurry or suspension.

As stated above, the polyacrylic acid and the alkali metal hydroxide and/or alkaline earth metal hydroxide may undergo a chemical reaction in the presence of the aqueous solvent, to produce an alkali metal salt and/or an alkaline earth metal salt of polyacrylic acid. The alkali metal salt and/or alkaline earth metal salt of polyacrylic acid so obtained may be used as a binder of the negative electrode material. In some practical examples, based on the total dry weight of the negative electrode material, the amount of polyacrylic acid (PAA) used may be 5-15 wt %, preferably 8-10 wt %. In some practical examples, the molar ratio of carboxyl groups in the polyacrylic acid to the total amount of hydroxide ions in the alkali metal hydroxide and/or alkaline earth metal hydroxide is 0.2:1 to 1.5:1, preferably 0.8:1 to 1.2:1.

In some practical examples of method 1 of the present invention, the alkali metal hydroxide and/or alkaline earth metal hydroxide contains lithium hydroxide or is lithium hydroxide, and in step a), the materials which are dry-mixed also contain lithium carbonate. In some practical examples, the molar ratio of lithium ions in the lithium carbonate to carboxyl groups in the polyacrylic acid is 0.0001:1 to 0.2:1.

In the case where lithium carbonate is also added in step a) of method 1, the negative electrode material slurry obtained by method 1 of the present invention contains a composite formed by lithium polyacrylate and lithium carbonate; here, the composite of lithium polyacrylate and lithium carbonate is used as a binder of the negative electrode material.

It is known that in a lithium ion battery, lithium will react with a solvent (e.g. carbonic acid ester) in a liquid electrolyte, thereby forming an interface between a solid silicon-based material and the liquid electrolyte (i.e. a solid-electrolyte interphase, abbreviated as SEI); lithium carbonate is the main component of the SEI. The formation of an SEI will consume lithium and the internal resistance of the battery will increase, causing a loss of ion conductivity and a sharp fall in the battery capacity. Thus, researchers have so far proposed many methods for avoiding the emergence of an SEI.

According to method 1 of the present invention, if lithium carbonate is added in step a), the silicon-based material is coated by lithium carbonate in the negative electrode material which is finally formed. Contrary to the proposal to avoid an SEI in the conventional sense, the method of the present invention in fact specially provides an SEI. The inventors of the present invention unexpectedly discovered that by adding lithium carbonate in step a) of method 1, many unexpected effects can be realized:

For example, first of all, decomposition and deactivation of solvent in the liquid electrolyte can be reduced or avoided, so as to reduce initial reversible capacity caused thereby, and increase the initial coulombic efficiency of the battery; and the production of gas in charging/discharging cycles can be avoided.

In addition, compared with the non-uniform, loose and insulating SEI which is avoided with great effort in the prior art, the present invention can form uniform, compact lithium carbonate on the surface of the silicon-based material by actively adding lithium carbonate, and can inhibit the formation of an SEI, thereby reducing internal resistance and enhancing ion conductivity. The lithium carbonate SEI does not dissolve in a solvent (e.g. a carbonic acid ester) of the liquid electrolyte, so the uniformity of the lithium carbonate SEI, as well as the stability and purity of the liquid electrolyte, can be maintained for a protracted length of time. Furthermore, the lithium carbonate SEI can also separate the silicon-based material from the liquid electrolyte, thereby preventing undesired reactions between the silicon-based material and the liquid electrolyte. At the same time, as a lithium source, the lithium carbonate can also reduce the consumption of lithium ions in the liquid electrolyte in successive charging/discharging cycles.

In addition, in the present invention, the lithium carbonate is added to the negative electrode material, not to the liquid electrolyte. If lithium carbonate is added to the liquid electrolyte, it is necessary to make the lithium carbonate into an aqueous solution in advance, then to add the aqueous solution of lithium carbonate to the liquid electrolyte, and finally to remove water from the liquid electrolyte; the process is complex, and the costs are high. In the present invention, solid-state lithium carbonate is added to the negative electrode material directly, thereby avoiding the abovementioned drawbacks.

[Lithium Ion Battery and Solid-State Battery]

The present invention also provides a lithium ion battery, containing a negative electrode prepared from a negative electrode material obtained by the abovementioned method according to the present invention.

The present invention also provides a solid-state battery, containing a negative electrode prepared from a negative electrode material obtained by the abovementioned method according to the present invention.

In addition to the negative electrode, the lithium ion battery may also contain a positive electrode, a separator and a liquid electrolyte.

In addition to the negative electrode, the solid-state battery may also contain a positive electrode and an electrolyte, and an optionally present separator.

There are no special requirements for the positive electrode material of the lithium ion battery and the solid-state battery; known positive electrode materials for lithium ion batteries may all be used in the present invention. In some practical examples, a lithium-based positive electrode may be used as the positive electrode. In a non-limiting practical example of the lithium-based positive electrode, the following may be included: metal lithium; a lithium alloy, e.g. a lithium-indium alloy; a laminate of lithium and one or more other metals, e.g. a lithium-indium laminate; and any combination thereof.

In some practical examples of the lithium ion battery, the liquid electrolyte may be obtained by dissolving a lithium salt in an organic solvent. There are no special requirements for the lithium salt; known lithium salts capable of being used for lithium ion batteries may all be used in the present invention. A suitable organic solvent may be a carbonate ester. Carbonate esters which may be used in the present invention include but are not limited to cyclic carbonate esters, e.g. ethylene carbonate (EC), propylene carbonate, fluoroethylene carbonate (FEC) and difluoroethylene carbonate, etc.; linear carbonate esters, e.g. dimethyl carbonate (DMC), diethyl carbonate (DEC), ethyl methyl carbonate and fluorides thereof; and any combination of the above substances.

There are no special requirements for the separator in the lithium ion battery and the solid-state battery; known separators for lithium ion batteries or solid-state batteries may all be used in the present invention. In some practical examples, the separator may be made from the following substances: polyolefins, e.g. polyethylene, polypropylene and polybutylene; polyesters, e.g. polyethylene terephthalate. The separator may be in the form of a porous membrane or a porous sheet. The separator may be in a single layer, or may be a laminate of two or more layers.

In the solid-state battery of the present invention, the electrolyte is solid-state. Electrolytes which are commonly used in solid-state batteries may all be used in the present invention, as long as these electrolytes are materials capable of conducting lithium ions. For example, the solid-state electrolyte may be polyethylene oxide (PEO), a sulfide capable of conducting lithium ions, a chloride capable of conducting lithium ions, or a combination of these substances. The solid-state electrolyte may be in a single layer, or may be a laminate of two or more layers.

In addition, the lithium ion battery or solid-state battery of the present invention may optionally contain other additives, as long as these additives do not adversely affect the electrochemical properties of the battery. The other additives (if present) may be contained in or among the positive electrode, negative electrode, liquid electrolyte, solid-state electrolyte and/or separator.

There are no special restrictions on a current collector; known current collectors for lithium ion batteries or solid-state batteries may all be used in the present invention. In some practical examples, a positive electrode current collector may be aluminium foil. In some practical examples, a negative electrode current collector may be a nickel foil or a nickel-coated copper foil. The inventors of the present invention unexpectedly discovered that due to the use of a nickel foil or a nickel-coated copper foil as the negative electrode current collector, adhesion between the negative electrode material and the negative electrode current collector is very strong, so that the integrity of the negative electrode and the entire battery can be maintained in successive charging/discharging cycles, improving the electrochemical properties of the battery, in particular the cycle properties and rate properties.

The lithium ion battery and solid-state battery of the present invention may be used in an energy storage system or electric vehicle.

EMBODIMENTS

[Materials]

Nano-silicon: negative electrode active material, particle size 50 nm, purchased from Sigma-Aldrich.

Superconducting carbon black (Super P): carbon material, particle size about 20 nm, purchased from the company Timcal.

KS6L: flake graphite, carbon material, particle size about 6 μm, purchased from the company Timcal.

Graphite powder: carbon material, particle size 2-10 μm, purchased from Shenzhen Kejingstar Technology Ltd.

PAA: polyacrylic acid, used to form a binder, volume average molecular weight (Mv): about 450,000, purchased from the company Aldrich.

Celgard 2325: separator, polypropylene-polyethylene film (PP/PE), purchased from Shenzhen Kejingstar Technology Ltd.

[Preparation of Negative Electrode Material]

Embodiment 1

Figure 4:
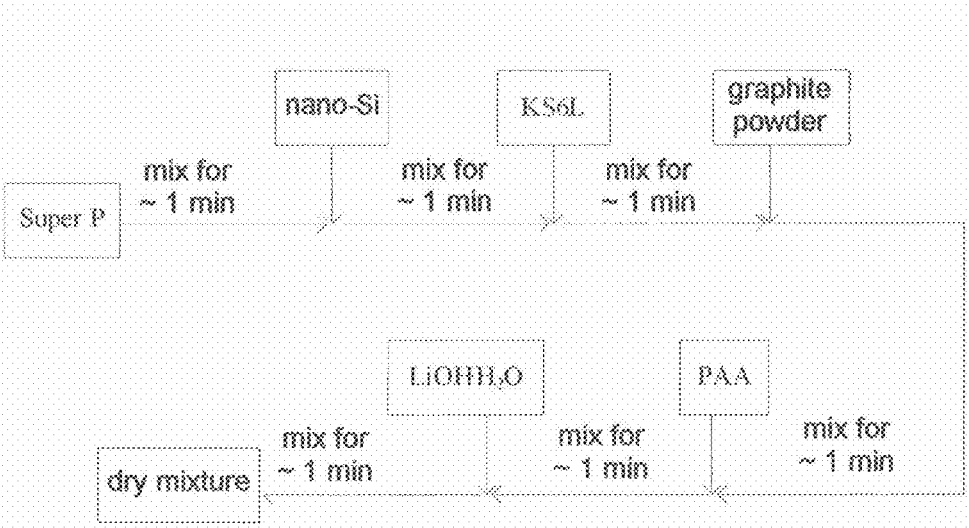
FIG. 4 schematically shows a flow chart of a method for preparing a negative electrode material according to an embodiment of the present invention.
Figure 4:

As shown in FIG. 4, at room temperature and atmospheric pressure, 2 g of Super P is weighed out and added to a Breville powder mixer (BBL800 stirrer, purchased from Guangzhou Boyu Trading Co., Ltd.), and stirred for about 1 minute at the maximum speed permitted by the mixer (about 1000 rpm). Next, 18 g of nano-silicon, 20 g of KS6L, 50 g of graphite powder, 7 g of PAA and 3 g of LiOH.H$_2$O are added in sequence to the Breville powder mixer, and stirring is carried out for about 1 minute at the maximum speed permitted by the mixer in each interval between additions, to obtain 100 g of a dry mixture.

A sample of the dry mixture is taken and placed between two 2 mm×6 mm transparent glass plates, then visually inspected to determine whether any white spots or particles are present in the sample. If the sample has spots or particles, then stirring of the dry mixture in the mixer is continued for 1 minute at the maximum speed permitted by the mixer. If there are no white spots in the sample, and the sample is a uniform powder, then the following slurry preparation step is entered directly.

Next, 100 g of water is added to a vacuum stirrer (CA-40 vacuum stirrer, purchased from Guangzhou Haomei Equipment Co., Ltd.). While stirring at a speed of 500 rpm, the dry mixture is added to the water, then the stirring speed is adjusted to 900 rpm, and stirring is continued for 20 minutes. Next, the stirring speed is adjusted to 2500 rpm, and stirring is continued for 30 minutes. Next, the stirring speed is adjusted to 700 rpm, and the pressure is adjusted from atmospheric pressure to a vacuum; stirring is continued for 20 minutes, to obtain a negative electrode material slurry.

Embodiment 2

Figure 5:
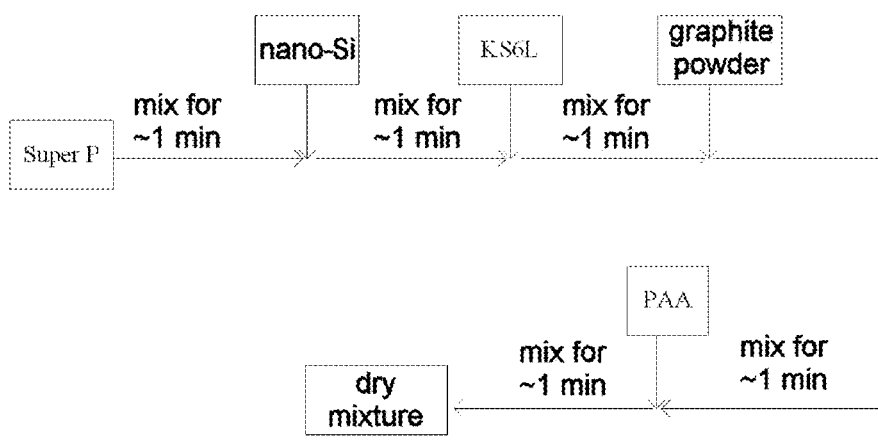
FIG. 5 schematically shows a flow chart of a method for preparing a negative electrode material according to an embodiment of the present invention.
Figure 5:
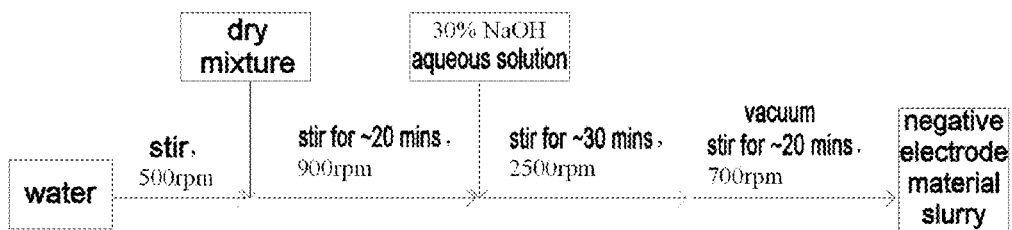

As shown in FIG. 5, at room temperature and atmospheric pressure, 2 g of Super P is weighed out and added to a Breville powder mixer (BBL800 stirrer, purchased from Guangzhou Boyu Trading Co., Ltd.), and stirred for about 1 minute at the maximum speed permitted by the mixer (about 1000 rpm). Next, 18 g of nano-silicon, 20 g of KS6L, 50 g of graphite powder and 7 g of PAA are added in sequence to the Breville powder mixer, and stirring is carried out for about 1 minute at the maximum speed permitted by the mixer in each interval between additions, to obtain 97 g of a dry mixture.

A sample of the dry mixture is taken and placed between two 2 mm×6 mm transparent glass plates, then visually inspected to determine whether any white spots or particles are present in the sample. If the sample contains spots or particles, then stirring of the dry mixture in the mixer is continued for 1 minute at the maximum speed permitted by the mixer. If there are no white spots in the sample, and the sample is a uniform powder, then the following slurry preparation step is entered directly.

Next, 100 g of water is added to a vacuum stirrer (CA-40 vacuum stirrer, purchased from Guangzhou Haomei Equipment Co., Ltd.). While stirring at a speed of 500 rpm, the dry mixture is added to the water, then the stirring speed is adjusted to 900 rpm, and stirring is continued for 20 minutes. 10 g of a 30% NaOH aqueous solution prepared in advance is added to a mixture so obtained, then the stirring speed is adjusted to 2500 rpm, and stirring is continued for 30 minutes. Next, the stirring speed is adjusted to 700 rpm, and the pressure is adjusted from atmospheric pressure to a vacuum; stirring is continued for 20 minutes, to obtain a negative electrode material slurry.

Embodiment 3

A negative electrode material slurry is prepared in the same way as embodiment 1, except that after adding 3 g of LiOH.H$_2$O, 0.5 g of Li$_2$CO$_3$ is added, and 100.5 g of a dry mixture is thereby obtained.

Comparative Example 1

Figure 6:
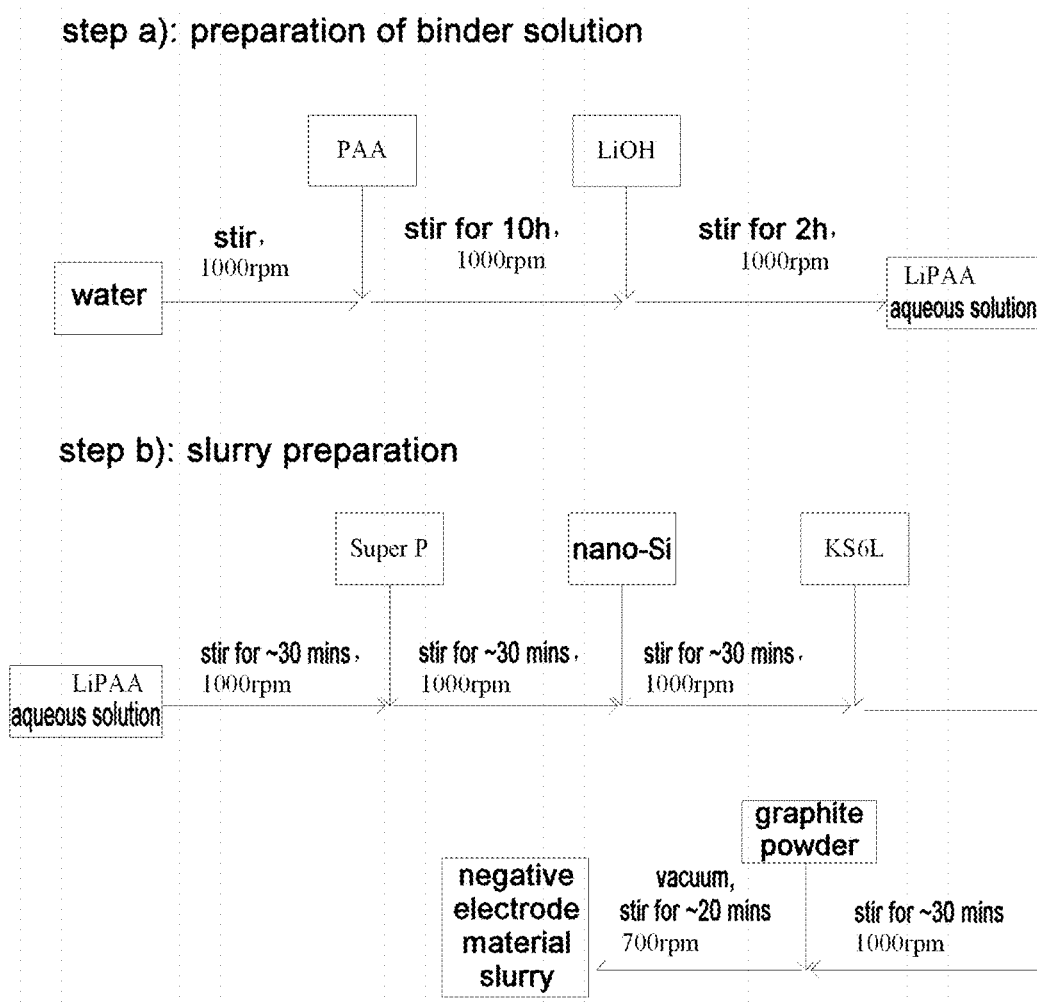
FIG. 6 schematically shows a flow chart of a method for preparing a negative electrode material according to a comparative example.

As shown in FIG. 6, at room temperature and atmospheric pressure, 90 g of water is added to a vacuum stirrer (CA-40 vacuum stirrer, purchased from Guangzhou Haomei Equipment Co., Ltd.). While stirring at a speed of 1000 rpm, 7 g of PAA is added to the water, and stirring is continued for 10 hours at a speed of 1000 rpm, to obtain an aqueous solution of PAA. 3 g of LiOH is added to the aqueous solution of PAA, and stirring is carried out for another 2 hours, maintaining a speed of 1000 rpm, to obtain an aqueous solution of LiPAA. Next, stirring is continued for about 30 minutes at a speed of 1000 rpm. Next, stirring at a speed of 1000 rpm is maintained, and 3 g of Super P, 18 g of nano-silicon, 20 g of KS6L and 50 g of graphite powder are added in sequence to the aqueous solution of LiPAA; stirring is carried out for about 30 minutes in each interval between additions. When the addition of materials is complete, the stirring speed is adjusted to 700 rpm, and the pressure is adjusted from atmospheric pressure to a vacuum; stirring is continued for 20 minutes, to obtain a negative electrode material slurry. The entire preparation process takes about 14 hours 20 minutes.

[Preparation of Electrode Plates]

The negative electrode material slurries obtained in embodiments 1-3 and comparative example 1 are separately spread onto copper foils, then the coated copper foils are placed in a vacuum oven (a VDL blast drying box from Binder, Germany), and dried for about 8 hours at about 60° C. in a vacuum. An EQ-T-06 battery electrode plate pressing machine (purchased from Shenzhen Weizhida Optoelectronic Technology Co., Ltd.) is used to form the dried copper foils into multiple Φ 12 mm negative electrode plates by pressing. The negative electrode plates thereby obtained will be used in the following lithium ion battery preparation experiment, electrode plate uniformity test and electrode plate adhesion test.

[Preparation of Lithium Ion Battery]

In a glove box (MB-10 compact, MBraun) filled with argon, the various negative electrode plates prepared as described above are used to assemble a button battery (CR2016). A lithium metal foil is used as a counter electrode. A solution of 1M LiPF$_6$ in FEC/EC/DMC (a mixture of fluoroethylene carbonate (FEC), ethylene carbonate (EC) and dimethyl carbonate (DMC) in the volume ratio 1:5:5) is used as a liquid electrolyte. Celgard 2325 is used as a separator. A lithium ion battery thus obtained is used for an electrochemical property test below according to FIG. 7.

Similarly, a lithium ion battery is prepared by the same method, except that lithium nickel manganese cobalt oxide is used instead of the lithium metal foil. A lithium ion battery thus obtained is used for an electrochemical property test below according to FIG. 8.

[Tests of Properties]

[Storage Stability of Slurry]

The negative electrode slurries obtained in embodiment 1 and comparative example 1 are sampled separately. The viscosity of the samples is determined at a shear rate of 70 s$^{-1}$ in an Anton Paar Rheometer MCR 52 (purchased from the Shanghai Representative Office of Anton Paar GmbH, Austria). The viscosity of the samples is measured after 1 day, 2 days, 5 days and 7 days, and the results are recordd in table 1 below.

TABLE 1

|  | Comparative example 1 sample viscosity (mPa/s) | Embodiment 1 sample viscosity (mPa/s) |
| --- | --- | --- |
| After 1 day | 5200 | 11400 |
| After 2 days | 4900 | 12300 |
| After 5 days | 4700 | 12200 |
| After 7 days | 4500 | 12300 |

It can be clearly seen from table 1 that the viscosity of the sample from embodiment 1 remains almost unchanged from the end of the 2nd day until the end of the 7th day, whereas the viscosity of the sample from comparative example 1 steadily falls. Hence, the negative electrode material slurry prepared in accordance with the method of the present invention has a long storage period, and good storage stability.

[Uniformity of Electrode Plates]

Uniformity tests are carried out on the electrode plates made from the negative electrode material slurries of embodiment 1 and comparative example 1. For each test, 24 electrode plates are taken, the weight and thickness of these 24 electrode plates are measured separately, and the weight deviation and thickness deviation of the electrode plates are calculated according to the sample standard deviation formula below; the calculation results are recorded in table 2 below.

$$S = \sqrt{\frac{1}{N-1} \sum_{i=1}^{X} (X_i - \overline{X})^2},$$

where S represents the weight deviation or thickness deviation;

N is 24;

$X_i$, i.e. $X_1, X_2, \ldots$ up to $X_{24}$, represents the respective weights or thicknesses of the 24 electrode plates;

$\overline{x}$ represents the mean value of weight or the mean value of thickness of the 24 electrode plates used.

TABLE 2

|  | Weight standard deviation | Thickness standard deviation |
| --- | --- | --- |
| Comparative example 1 | 6% | 4% |
| Embodiment 1 | 3% | 2% |

It can be clearly seen from table 2 that both the weight and thickness of the electrode plates of embodiment 1 are more uniform than the samples from comparative example 1.

[Adhesion of Electrode Plates]

An FMT-310 force tester (purchased from the company ALLURIS) is used to measure the adhesion of the electrode plates made from the negative electrode material slurries of embodiment 1 and comparative example 1. For each test, 3 electrode plates are taken, the mean value of adhesion measured for the 3 electrode plates is found, and this mean value is recorded as the adhesion of the electrode plates. Specifically, a 2 cm wide transparent adhesive tape is adhered to each electrode plate on the side on which the slurry is spread, and the electrode plate with the transparent adhesive tape adhered thereto is fixed at an upper fixing end and a lower fixing end of the force tester. The adhesive tape is pulled at a uniform speed of 100 mm per minute in a direction perpendicular to the surface of the electrode plate, the pulling force is slowly increased, and the value of the pulling force when the adhesive tape begins to be pulled is the measured electrode plate adhesion (units: N/m).

TABLE 3

|  | Comparative example 1 | Embodiment 1 |
|---|---|---|
| Adhesion (N/m) | 150-200 | 200-250 |

It can be seen from table 3 that the adhesion of the sample from embodiment 1 is significantly superior to that of the sample from comparative example 1.

[Electrochemical Properties of Lithium Ion Battery]

Figure 7:
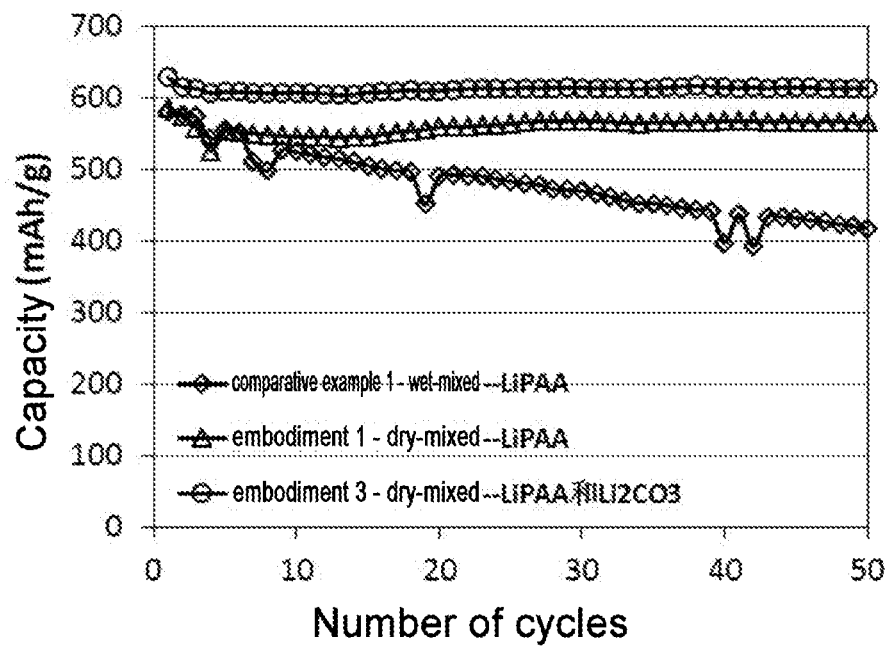
FIG. 7 compares the cycle properties of lithium ion batteries prepared according to a comparative example and some embodiments of the present invention.

FIG. 7 compares the charging/discharging properties of batteries prepared using the negative electrode slurries of comparative example 1, embodiment 1 and embodiment 3 under a current density of 1 C, wherein each battery uses a lithium metal foil as a counter electrode.

The cycle properties of each battery are tested at 25° C., in an Arbin battery testing system (purchased from the company Arbin Corporation). Within a voltage range of 0.01-0.9 V (vs Li/Li$^+$), each battery undergoes a 1st charging/discharging cycle at 0.1 C, 2nd and 3rd charging/discharging cycles at 0.3 C, and the remaining charging/discharging cycles at 1 C. The total load in each negative electrode is about 7 mg/cm$^2$.

As can be seen from FIG. 7, the battery obtained from the negative electrode material slurry that was dry-mixed in embodiment 1 has better cycle properties than the battery obtained using the negative electrode material slurry that was wet-mixed in comparative example 1. Compared with embodiment 1, Li$_2$CO$_3$ is added in embodiment 3, further improving the cycle properties of the battery.

Figure 8:
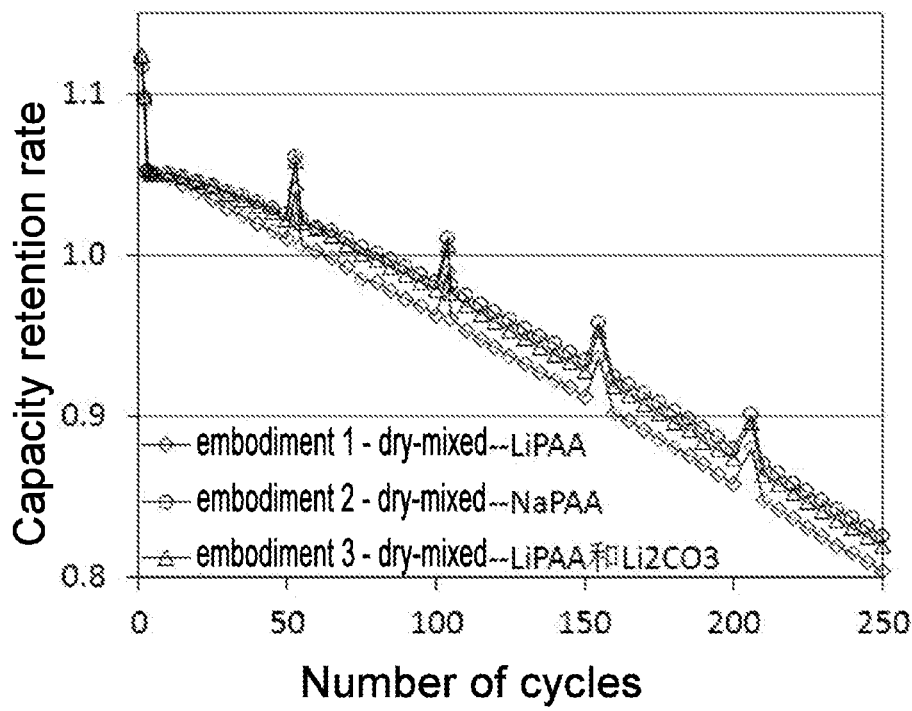
FIG. 8 compares the cycle properties of lithium ion batteries prepared according to some embodiments of the present invention.

FIG. 8 compares the charging/discharging properties of batteries prepared using the negative electrode material slurries of embodiment 1, embodiment 2 and embodiment 3 under a current density of 1 C, wherein each battery uses lithium nickel manganese cobalt oxide as a counter electrode.

The cycle properties of each battery are tested at 25° C., in an Arbin battery testing system (purchased from the company Arbin Corporation). Within a voltage range of 2.5-4.2 V (positive electrode lithium nickel manganese cobalt oxide), each battery undergoes a 1st charging/discharging cycle at 0.1 C, 2nd and 3rd charging/discharging cycles at 0.3 C, and all the remaining charging/discharging cycles at 1 C, except that the 51st, 101st, 151st and 201st charging/discharging cycles are carried out at 0.1 C. The total load in each negative electrode is about 7 mg/cm$^2$.

As can be seen from FIG. 8, embodiment 1, embodiment 2 and embodiment 3 all obtain the negative electrode material slurry by dry mixing. Embodiment 2 uses NaPAA as a negative electrode binder, and the battery obtained therefrom has better cycle properties than the battery obtained in embodiment 1 using LiPAA as a negative electrode binder. Compared with embodiment 1, Li$_2$CO$_3$ is added in embodiment 3, further improving the cycle properties of the battery.

Preferred embodiments of the present invention have been described herein, including optimal methods, already known to the inventors, for realizing the subject matter for which protection is claimed. Variants of these preferred embodiments may become obvious to those skilled in the art when the above description is read. The inventors expect that those skilled in the art will be able to use such variants appropriately, and it is the intention of the inventors that the present invention shall be implementable in a manner different from that specifically described herein. Thus, the present invention includes all modifications and equivalent forms of the subject matter stated in the attached claims that are permitted by applicable methods. In addition, unless otherwise specified herein or unless there is an obvious contradiction in context, the present invention encompasses any combination of the above factors in all possible variants thereof.

The invention claimed is:

1. A method for preparing a negative electrode material for a battery, comprising the following steps:
   a) dry-mixing the following components, without adding any solvent, to obtain a dry mixture:
   polyacrylic acid,
   a silicon-based material,
   an alkali metal hydroxide and/or an alkaline earth metal hydroxide powder,
   a carbon material, and
   an optionally present lithium carbonate; and
   b) mixing the dry mixture obtained in step a) with an aqueous solvent, to obtain the negative electrode material,
   wherein the aqueous solvent is water or a mixture of water and a solvent miscible with water,
   wherein, based on the total dry weight of the negative electrode material, the silicon-based material is in an amount of 10-50 wt %, and the polyacrylic acid is in an amount of 5-10 wt %, and
   wherein the molar ratio of carboxyl groups in the polyacrylic acid to the total amount of hydroxide ions in the alkali metal hydroxide and/or alkaline earth metal hydroxide powder is 0.2:1 to 1.5:1.

2. The method according to claim 1, wherein the alkali metal hydroxide and/or the alkaline earth metal hydroxide powder is selected from the group consisting of lithium hydroxide, sodium hydroxide, potassium hydroxide, calcium hydroxide, and combinations thereof.

3. The method according to claim 1, wherein the alkali metal hydroxide and/or the alkaline earth metal hydroxide powder contains lithium hydroxide, and lithium carbonate is present in the dry mixture of step a).

4. The method according to claim 1, wherein the alkali metal hydroxide and/or the alkaline earth metal hydroxide powder is lithium hydroxide; and the molar ratio of carboxyl groups in the polyacrylic acid to the total amount of hydroxide ions in the alkali metal hydroxide and/or the alkaline earth metal hydroxide powder is 0.8:1 to 1.2:1.

5. The method according to claim 1, wherein the alkali metal hydroxide and/or the alkaline earth metal hydroxide powder contains lithium hydroxide, and lithium carbonate is present in the dry mixture of step a); and the molar ratio of lithium ions in the lithium carbonate to carboxyl groups in the polyacrylic acid is 0.0001:1 to 0.2:1.

6. The method according to claim 1, wherein the dry-mixing time in step a) is 30 seconds to 30 minutes.

7. The method according to claim 1, wherein the silicon-based material is selected from silicon, silicon alloys, silicon oxides, silicon/carbon composites and combinations thereof.

8. The method according to claim 1, wherein the carbon material is selected from carbon black, graphite, graphene, acetylene black, ketjenblack, carbon nanotubes, carbon nanofibres and combinations thereof.

9. The method according to claim 1, wherein the dry-mixing time in step a) is 2-5 minutes.

10. The method according to claim 1, wherein the carbon material is selected from carbon black, graphite, graphene, acetylene black, ketjenblack, carbon nanotubes, carbon nanofibres and combinations thereof; the carbon black is superconducting carbon black; and/or the graphite is graphite powder, flake graphite or a combination thereof.

11. The method according to claim 1, wherein the aqueous solvent is water or a mixture of water and ethanol, n-propanol, isopropanol or a combination thereof.

12. The method according to claim 1, wherein the dry mixture of step a) consists of
the polyacrylic acid,
the silicon-based material,
the alkali metal hydroxide and/or an alkaline earth metal hydroxide powder,
a carbon material, and
the optionally present lithium carbonate.

13. A method for producing a battery, the method comprising preparing a negative electrode from the negative electrode material prepared by the method according to claim 1, wherein the battery is a lithium ion battery or a solid-state battery.

14. The method according to claim 13, wherein the negative electrode also contains a negative electrode current collector, which is a nickel foil or a nickel-coated copper foil.

15. A method for preparing a negative electrode material for a battery, comprising the following steps:
a) dry-mixing the following components, without adding any solvent, to obtain a dry mixture:
polyacrylic acid,
a silicon-based material, and
an optionally present carbon material;
b) mixing an alkali metal hydroxide with water, to obtain an aqueous solution of the alkali metal hydroxide; and
c) mixing the dry mixture obtained in step a), the aqueous solution of the alkali metal hydroxide obtained in step b) and an optionally present aqueous solvent, to obtain the negative electrode material,
wherein the aqueous solvent is water or a mixture of water and a solvent miscible with water.

16. The method according to claim 15, wherein the alkali metal hydroxide is selected from lithium hydroxide, sodium hydroxide, potassium hydroxide and combinations thereof.

17. The method according to claim 15, wherein the dry-mixing time in step a) is 30 seconds to 30 minutes.

18. The method according to claim 15, wherein the silicon-based material is selected from silicon, silicon alloys, silicon oxides, silicon/carbon composites and combinations thereof.

19. The method according to claim 15, wherein the carbon material is selected from carbon black, graphite, graphene, acetylene black, ketjenblack, carbon nanotubes, carbon nanofibres and combinations thereof.

20. The method according to claim 15, wherein the alkali metal hydroxide is sodium hydroxide; and the molar ratio of carboxyl groups in the polyacrylic acid to hydroxide ions in the alkali metal hydroxide is 0.8:1 to 1.2:1.

21. The method according to claim 15, wherein the dry-mixing time in step a) is 2-5 minutes.

22. The method according to claim 15, wherein the carbon material is selected from carbon black, graphite, graphene, acetylene black, ketjenblack, carbon nanotubes, carbon nanofibres and combinations thereof; the carbon black is superconducting carbon black; and/or the graphite is graphite powder, flake graphite or a combination thereof.

23. The method according to claim 15, wherein the aqueous solvent is water or a mixture of water and ethanol, n-propanol, isopropanol or a combination thereof.

24. The method according to claim 15, wherein the dry mixture of step a) consists of
the polyacrylic acid,
the silicon-based material, and
the optionally present carbon material.

25. The method according to claim 15, wherein, based on the total dry weight of the negative electrode material, the silicon-based material is in an amount of 5-88 wt %, and the polyacrylic acid is in an amount of 5-15 wt %, and
wherein the molar ratio of carboxyl groups in the polyacrylic acid to the total amount of hydroxide ions in the alkali metal hydroxide is 0.2:1 to 1.5:1.

26. A method for producing a battery, the method comprising preparing a negative electrode from the negative electrode material prepared by the method according to claim 15, wherein the battery is a lithium ion battery or a solid-state battery.

27. The method according to claim 26, wherein the negative electrode also contains a negative electrode current collector, which is a nickel foil or a nickel-coated copper foil.

* * * * *